(12) United States Patent
Trieb (10) Patent No.: US 8,418,840 B2
(45) Date of Patent: Apr. 16, 2013

(54) CONVEYOR FOR THE TRANSPORT OF BULK MATERIALS

(75) Inventor: Herbert Trieb, Lochau (AT)

(73) Assignee: Innova Patent GmbH, Wolfurt (AT)

( * ) Notice: Subject to any disclaimer, the term of this patent is extended or adjusted under 35 U.S.C. 154(b) by 0 days.

(21) Appl. No.: 13/303,451

(22) Filed: Nov. 23, 2011

(65) Prior Publication Data

US 2012/0138433 A1 Jun. 7, 2012

(30) Foreign Application Priority Data

Dec. 2, 2010 (AT) ................................. A 2003/2010

(51) Int. Cl.
*B65G 39/20* (2006.01)

(52) U.S. Cl.
USPC ............................ 198/845; 198/681; 198/817

(58) Field of Classification Search .................. 198/838, 198/845, 817, 818, 836.1, 681, 860.1
See application file for complete search history.

(56) References Cited

U.S. PATENT DOCUMENTS

| | | | |
|---|---|---|---|
| 3,490,773 A * | 1/1970 | Dennison | 198/845 |
| 5,791,454 A * | 8/1998 | Trieb | 198/838 |
| 6,588,583 B2 | 7/2003 | Trieb | |
| 6,935,490 B2 | 8/2005 | Trieb | |
| 7,571,803 B2 * | 8/2009 | Trieb | 198/845 |
| 7,628,267 B2 * | 12/2009 | Trieb | 198/845 |

FOREIGN PATENT DOCUMENTS

| EP | 1 295 817 B1 | 3/2003 |
|---|---|---|
| EP | 1 452 466 B1 | 9/2004 |

* cited by examiner

*Primary Examiner* — James R Bidwell
(74) *Attorney, Agent, or Firm* — Laurence A. Greenberg; Werner H. Stemer; Ralph E. Locher (57) ABSTRACT

A conveyor for the transport of bulk materials contains three pairs of supporting cables located vertically one above another. A conveyor belt is movable along the supporting cables and at its ends guided over return drums. Fastened to the conveyor belt are supporting beams having ends mounting rollers, which roll along the middle and lower supporting cables. Supporting frames are located at a distance apart in the longitudinal direction of the conveyor and by which the supporting cables are mutually connected. The supporting frames are formed by two vertically aligned supporting struts and two horizontally aligned connecting struts and, the upper ends of the supporting struts are connected to one of the upper supporting cables. The connecting struts are connected by clamping devices located thereon to the middle and to the lower supporting cables. The clamping devices located on the connecting struts form an acute angle with the connecting struts.

15 Claims, 6 Drawing Sheets

CONVEYOR FOR THE TRANSPORT OF BULK MATERIALS

CROSS-REFERENCE TO RELATED APPLICATION

This application claims the priority, under 35 U.S.C. §119, of Austrian application A 2003/2010, filed Dec. 2, 2010; the prior application is herewith incorporated by reference in its entirety.

BACKGROUND OF THE INVENTION

Field of the Invention

The present invention relates to a conveyor for the transport of bulk materials and contains three pairs of supporting cables, which are respectively located approximately vertically one above the other. The conveyor further contains a self-contained conveyor belt, which is movable along the supporting cables from a loading station to an unloading station and in the end stations is guided over return drums. Wherein fastened to the conveyor belt are supporting beams, which are located at a distance apart and are aligned transversely to the longitudinal extent of the conveyor belt and at the ends of which are mounted rollers, which roll along the middle and the lower supporting cables. The conveyor further contains supporting frames, which are located at a distance apart in the longitudinal direction of the conveyor and by which the supporting cables are mutually connected. The supporting frames are formed by at least two at least approximately vertically aligned supporting struts and at least two at least approximately horizontally aligned connecting struts and, furthermore, the upper ends of the supporting struts are connected to respectively one of the two upper supporting cables. The connecting struts are connected by clamping devices to the middle and the lower supporting cables.

Conveyors of this type, which are known, for example, from European patents EP 1295817 B1 (corresponding to U.S. Pat. No. 6,588,583) and EP 1452466 B1 (corresponding to U.S. Pat. No. 6,935,490), serve to convey bulk materials, such as overburden materials, ores, coal and the like, from a loading station to an unloading station. These conveyors have supporting cables, along which a self-contained conveyor belt is movable. Fastened for this purpose to the top side of the conveyor belt are transversely aligned supporting beams, at both ends of which are mounted rollers by which the conveyor belt is moved along two pairs of supporting cables disposed vertically one above the other. The rollers are configured on both sides with roller flanges. In the end stations, the conveyor belt is guided over return drums. Above the two pairs of supporting cables, a further pair of supporting cables is provided. Furthermore, in the longitudinal direction of the conveyor are provided mutually spaced supporting frames, which serve to connect the supporting cables one to another to form a stable unit. That strand of the conveyor belt which is moved along the middle supporting cables serves to convey bulk materials from a loading station to an unloading station. The lower strand of the conveyor belt is moved back along the two lower supporting cables from the unloading station to the loading station. The upper supporting cables serve to stabilize the conveyor.

The supporting frames are formed by two vertically aligned supporting struts and by two horizontally aligned connecting struts, which latter connect the supporting struts one to another. The upper ends of the vertically aligned supporting struts are fixedly connected to the two upper supporting cables, and the two horizontally aligned connecting struts are fixedly connected by vertical webs to the middle supporting cables and to the lower supporting cables.

During operation of such conveyors, large lateral wind forces can arise, by which the conveyor belt can be laterally deflected such that one of the two roller flanges can run up onto the clamping devices by which the connecting struts are fixedly connected to the supporting cables. Hence, on the one hand, very high friction forces arise between the roller flanges and the clamping devices. On the other hand, strong loads are therefore generated in the clamping devices transversely to the motional direction of the conveyor belt, since the horizontally acting wind forces are transmitted via the vertically aligned webs to the horizontally aligned connecting struts of the supporting frames. For this, the clamping devices must be dimensioned correspondingly large.

SUMMARY OF THE INVENTION

It is accordingly an object of the invention to provide a conveyor for a transport of bulk materials which overcome the above-mentioned disadvantages of the prior art devices of this general type, which configures the clamping devices such that even very large lateral loads can be absorbed by these. This is achieved according to the invention by virtue of the fact that the clamping devices located on the connecting struts and respectively assigned to the middle supporting cables and the lower supporting cables form an acute angle with the connecting struts, and that the rollers are configured with a roller flange on one side only.

With the foregoing and other objects in view there is provided, in accordance with the invention a conveyor for transporting bulk materials. The conveyor contains three pairs of supporting cables disposed vertically one above another and include lower supporting cables, middle supporting cables and upper supporting cables. The conveyor further has return drums and a self-contained conveyor belt being movable along the supporting cables and at ends of the conveyor. The conveyor belt is guided over the return drums. Supporting beams are fastened to the conveyor belt. The supporting beams are disposed at a distance apart and aligned transversely to a longitudinal extent of the conveyor belt and at ends of the supporting beams are disposed the mounted rollers. The mounted rollers roll along the middle supporting cables and the lower supporting cables. Supporting frames are disposed at a distance apart from each other in a longitudinal direction of the conveyor and by which the supporting cables are mutually connected. Each of the supporting frames are formed from two at least approximately vertically aligned supporting struts and two at least approximately horizontally aligned connecting struts. Upper ends of the vertically aligned supporting struts are respectively connected to one of the two upper supporting cables, and the horizontally aligned connecting struts are connected by clamping devices disposed thereon to the middle and to the lower supporting cables. The clamping devices are disposed on the connecting struts and respectively assigned to the middle supporting cables. The lower supporting cables form an acute angle with the connecting struts and the mounted rollers have a roller flange on one side only.

The clamping devices are hence subjected to far less bending load by lateral wind forces than is the case with the known conveyors. Furthermore, the fact that the rollers are configured with a roller flange on one side only avoids a situation in which one of the roller flanges runs up onto the clamping devices and, furthermore, the conveyor belt can be crossed over from a first track, for example supporting cables, to a second track, for example supporting rails, substantially more easily than is the case with the previously known conveyors in which the rollers are configured with roller flanges on both sides.

Preferably, the clamping devices disposed on a respective connecting strut are inclined toward each other, and the rollers are configured with the roller flange on the side facing toward the conveyor belt. Alternatively thereto, the clamping devices are inclined away from each other, and the rollers are configured with the roller flange on the side facing away from the conveyor belt.

According to a preferred embodiment, each clamping device has two clamping jaws, which at their ends facing away from the clamping surfaces are pivotable on the particular connecting strut about axes aligned at least approximately in the motional direction of the conveyor belt, the plane defined by the pivot axes of the two clamping jaws forming an acute angle of 5° to 60°, preferably of about 20°, with the connecting strut. Preferably, the plane of symmetry between the two clamping jaws forms an acute angle of 85° to 30°, preferably of about 70°, with the connecting strut. The two clamping jaws can here be tied to the associated supporting cable by a tension bolt aligned parallel to the plane defined by their pivot axes. Preferably, the two clamping jaws form an acute angle of 5° to 50°, in particular of about 40°, with each other. Preferably, the clamping jaw facing toward the roller flange of the roller forms an acute angle of somewhat less than 90° with the connecting strut.

According to an also preferred embodiment, the outer surface of the rollers is configured with a running groove, as well as in the direction of the roller flange with at least one oblique surface and, on the side facing away from the roller flange, with a cylindrical running surface. In particular, the rollers, away from the cable groove, are configured with a first oblique surface, which forms an angle of 10° to 60°, preferably of about 35°, with the roller axis, and also with a second oblique surface, which forms an angle of 5° to 20°, preferably of about 10°, with the roller axis. Furthermore, the clamping jaw facing toward the roller flange is preferably configured, on its side facing toward the roller flange, with a contact surface assigned to the roller flange.

Other features which are considered as characteristic for the invention are set forth in the appended claims.

Although the invention is illustrated and described herein as embodied in a conveyor for a transport of bulk materials, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
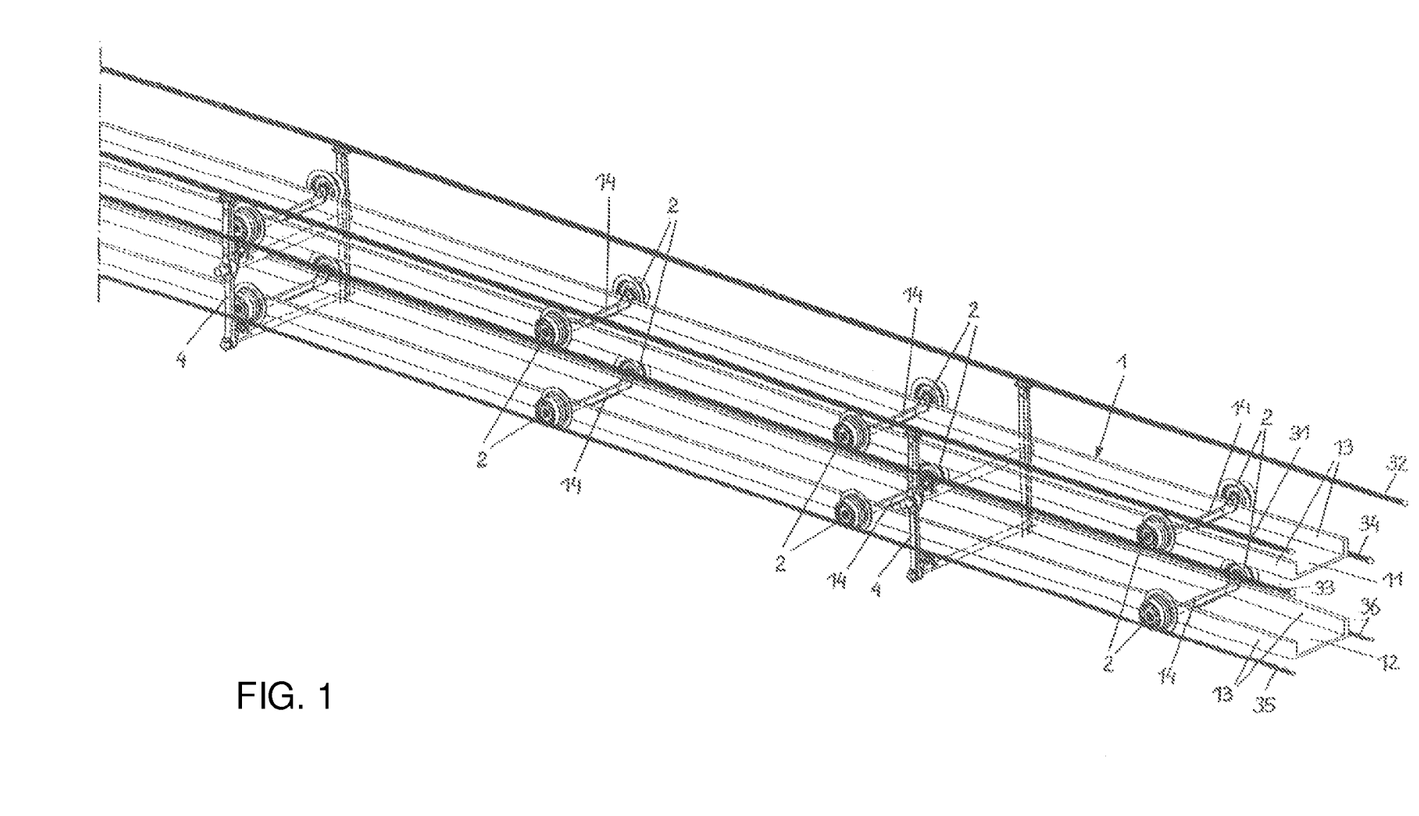
FIG. 1 is a diagrammatic, perspective view of a part of a conveyor for bulk materials according to the invention.

Referring now to the figures of the drawing in detail and first, particularly, to FIG. 1 thereof, there is shown a portion of a conveyor for bulk materials, such as overburden materials, ores, coal and the like. The conveyor consists of a self-contained conveyor belt 1, which is moved between a loading station and an unloading station and which in the two end stations is guided over return drums. An upper strand 11 of the conveyor belt 1 serves to convey the bulk materials from the loading station to the unloading station. After the unloading station and also before the loading station in the motional direction of the conveyor belt 1 are found turning devices, by which a lower strand 12 of the conveyor belt 1, which strand has been moved from the unloading station back to the loading station, is turned such that, even when the lower strand 12 of the conveyor belt 1 has been moved back to the loading station, the loading surface is found on the top side thereof, whereupon the lower strand 12 is turned back again before the loading station and in this position is guided around the return drum present in the loading station.

The conveyor belt 1 is configured on its two side margins with lateral, elastically deformable bars, so-called corrugated sidewalls 13, protruding up from its top side. Furthermore, the conveyor belt 1 is configured on its top side with supporting beams 14 which are aligned transversely to its motional direction and on the free ends of which are mounted rollers 2. The conveyor further has three pairs of supporting cables 31 to 36, which are disposed one above the other and which are mutually connected by supporting frames 4, whereby the entire conveyor is stabilized. The rollers 2 are guided along the two middle supporting cables 33 and 34 and along the two lower supporting cables 35 and 36.

Figure 2:
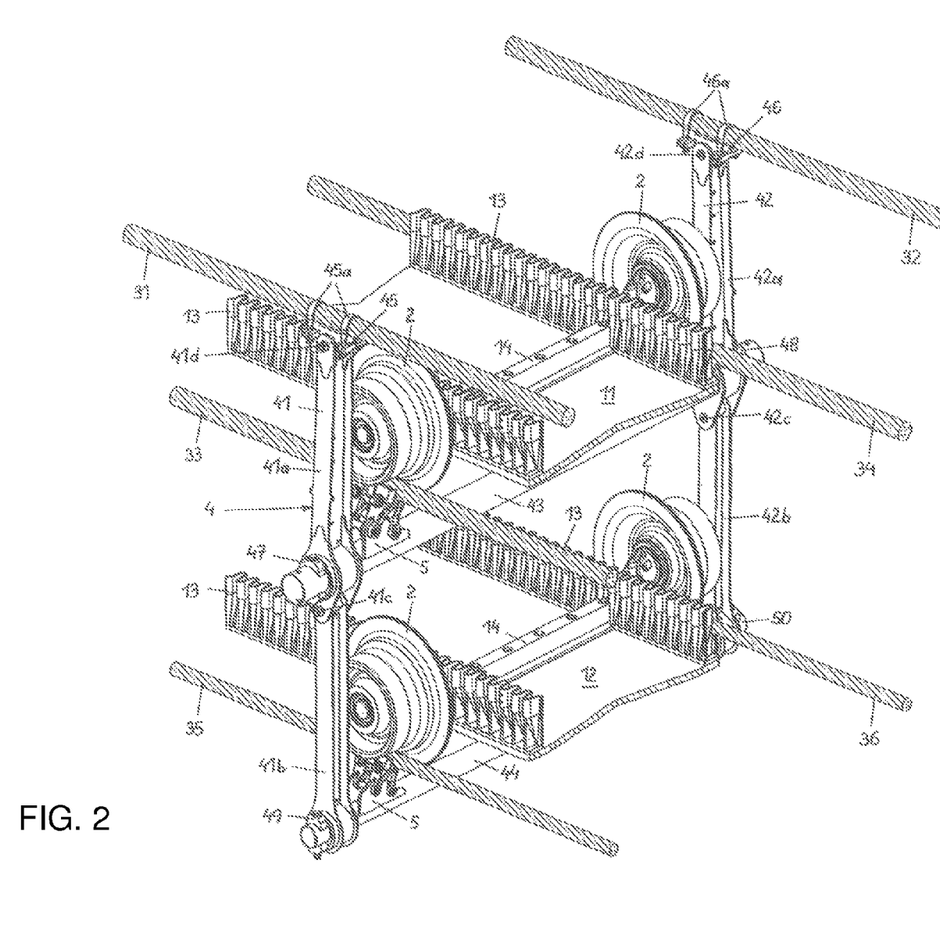
FIG. 2 is a diagrammatic, perspective view showing the part of the conveyor represented in FIG. 1, on an enlarged scale.

In FIG. 2, the upper supporting cables 31 and 32, the middle supporting cables 33 and 34 and the lower supporting cables 35 and 36 are represented. Along the middle supporting cables 33 and 34, the upper strand 11 of the conveyor belt 1 is moved from the loading station to the unloading station by the rollers 2. Along the lower supporting cables 35 and 36, the lower strand 12 of the conveyor belt 1 is moved in its turned position from the unloading station back to the loading station. At the lateral margins of the conveyor belt 1, protruding from the latter, are the approximately vertically upwardly directed corrugated sidewalls 13, which are extensible, whereby the conveyor belt 1 can be guided in the stations over the return drums present there. On the top side of the conveyor belt 1 are found the supporting beams 14, at whose ends are mounted the rollers 2, which roll along the supporting cables 33 to 36.

As can further be seen from FIG. 2, the supporting frames 4 are formed by two vertical supporting struts 41 and 42 and by two horizontal connecting struts 43 and 44. The supporting struts 41 and 42 here respectively consist of two supporting strut parts 41a and 41b and 42a and 42b, which are articulately connected to each other by a hinge pin 41c and 42c respectively. The two hinge pins 41c and 42c are aligned approximately horizontally and transversely to the supporting cables 31 to 36. Furthermore, the upper ends of the supporting strut parts 41a and 42a are mounted by hinge pins 41d and 42d, likewise pivotably about approximately horizontal axes aligned transversely to the supporting cables 31 to 36, on supporting bars 45 and 46, which are fixedly connected by brackets 45a and 46a to the upper supporting cables 31 and 32.

Moreover, the respectively upper supporting strut parts 41a and 42a are configured in their lower region with hubs 47 and 48, into which the connecting strut 43, configured as cylindrical pipe sections, projects and is rotatably mounted therein. In the same way, the lower supporting strut parts 41b and 42b are configured at their lower ends with hubs 49 and 50, into which the lower connecting struts 44, configured as cylindrical pipe sections, project and are rotatably mounted therein.

The connecting struts 43 and 44 are configured at their lateral ends with clamps 5, by which they are fixedly connected to the middle supporting cables 33 and 34 and the lower supporting cables 35 and 36.

As a result of the articulate mounting of the individual components of the supporting frames 4, these can adapt in their position to the loads which vary as a result of the operation of the conveyor, whereby the tension forces which arise in these are heavily reduced.

Figure 3:
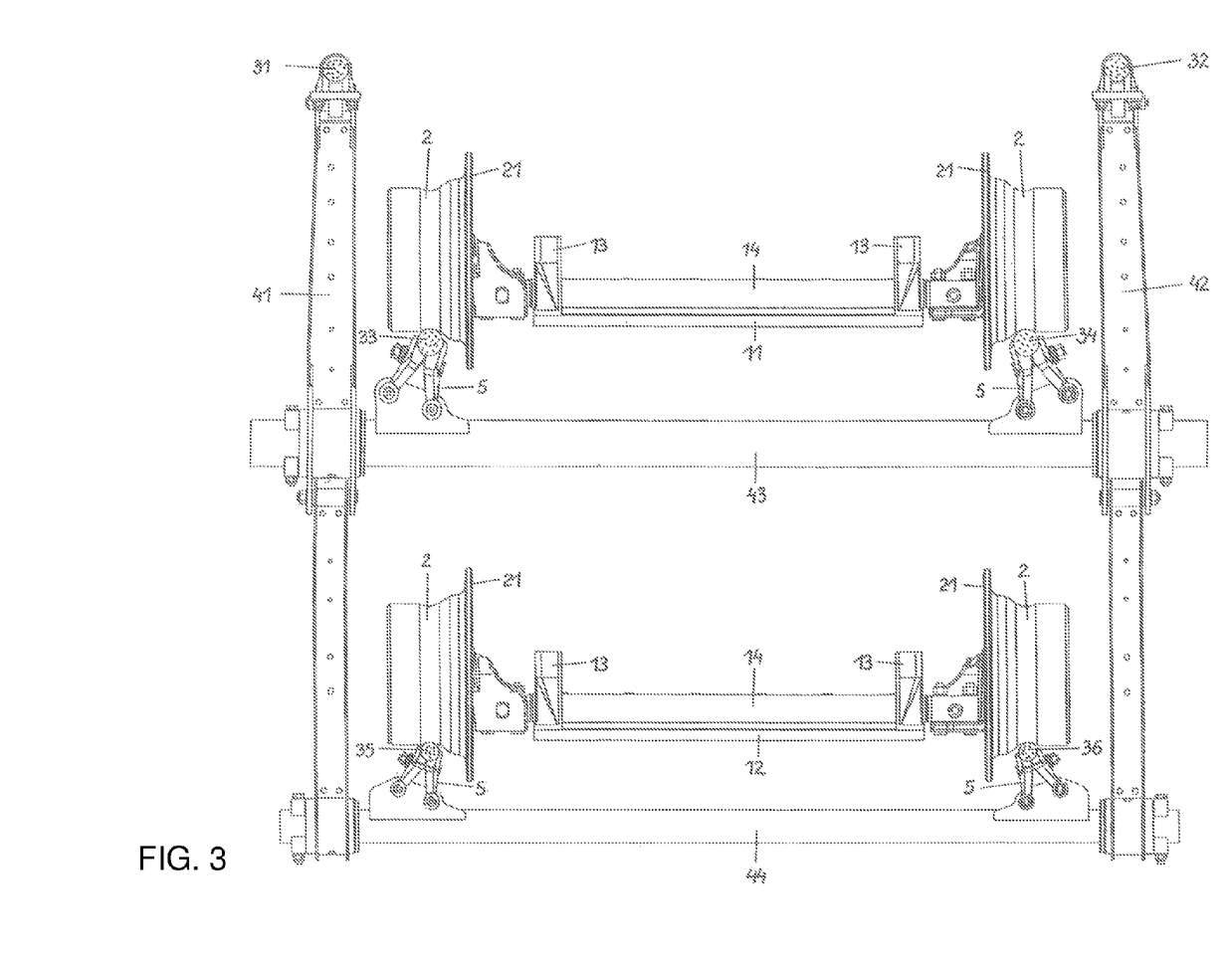
FIG. 3 is front view of a first embodiment of the conveyor according to the invention, viewed in a direction of movement of the conveyor belt.

As can be seen from FIG. 3, the clamping devices 5 are located at the lateral ends of the connecting struts 43 and 44 of the holding frames 4, wherein they form an acute angle of about 70° with the respective connecting strut 43 and 44 and wherein the two clamping devices 5 located on the connecting struts 43 and 44 are inclined toward each other. It can further be seen from FIG. 3 that the rollers 2 are configured with roller flanges 21 only on the side facing toward the strands 11 and 12 of the conveyor belt 1. Since the rollers 2 are thus configured with roller flanges 21 only on their sides facing toward the strands 11 and 12 of the conveyor belt 1, the clamping devices 5 can be inclined in relation to the connecting struts 43 and 44 or in relation to the axes of the rollers 2, without risk of the rollers 2 colliding with the clamping devices 5.

Figure 3A:
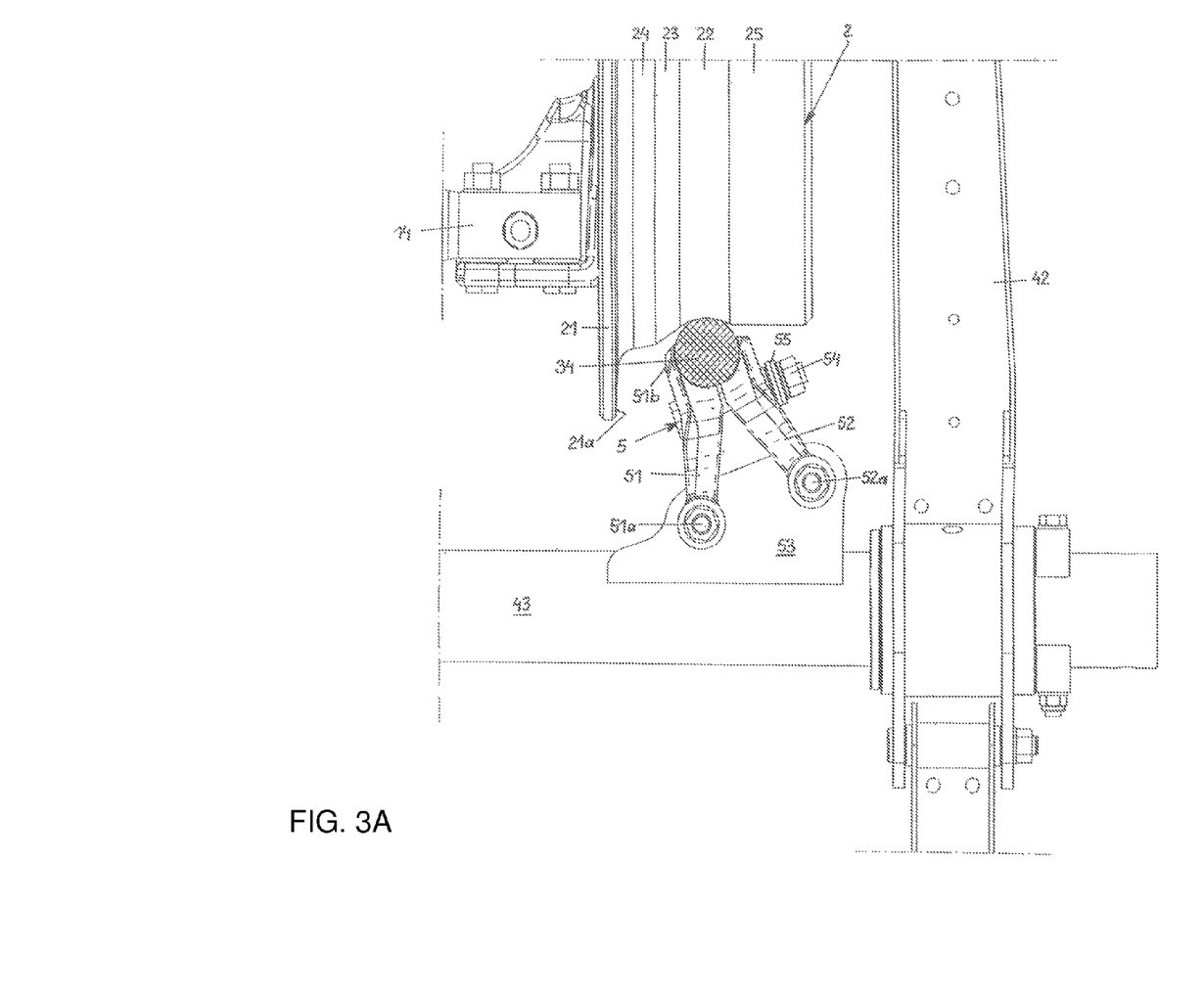
FIG. 3A is a front view showing a detail of the conveyor according to FIG. 3, on an enlarged scale in relation to FIG. 3.

As can be seen from FIG. 3A, the clamping devices 5 have two clamping jaws 51 and 52, which are mounted pivotably about axes 51a and 52a on a supporting piece 53 provided on the connecting strut 43 and which can be tied by a screw bolt 54, with intermediate compression spring 55, to the respectively assigned supporting cable, in FIG. 3A the supporting cable 34.

The clamping jaw 51 here forms an angle of somewhat less than 90° with the connecting strut 43, the clamping jaw 52 forms an angle of about 50° with the connecting strut 43, the two clamping jaws 51 and 52 form, for instance, an angle of 40° with each other, and the plane of symmetry between the two clamping jaws 51 and 52 forms an angle of about 70° with the connecting strut 43.

As can further be seen from FIG. 3A, the rollers 2 are configured in their middle region with a running groove 22, along which, in normal operation of the conveyor, they run along the associated supporting cables. Between the running groove 22 and the roller flange 21 is found an oblique surface 23, which forms an angle of about 35° with the axis of the roller 2. The oblique surface 23 comes to bear against the supporting cable 34 when the strand 12 of the conveyor belt 1, in particular due to wind forces, is laterally displaced. The horizontal forces which are hereby exerted upon the clamping device 5 are here transmitted, in particular by the clamping jaw 52, to the connecting strut 43.

The oblique surface 23 is followed in the direction of the roller flange 21 by a further oblique surface 24, which forms an angle of about 10° with the axis of the roller 2. As soon as the oblique surface 24 comes to bear against the supporting cable 34, no further transverse shifting of the strand 12 up to the supporting cable 34 can occur, since the side wall 21a of the roller flange 21 comes to bear against the clamping jaw 51. At this spot, the clamping jaw 51 is configured with a contact surface 51b which is flattened in accordance with the side wall 21a.

On the side facing away from the roller flange 21 is found on the roller 2, next to the running groove 22, a cylindrical running surface 25, with which the roller 2 then runs on the cable run 34 as soon as the strand 12 of the conveyor belt 1 has been horizontally shifted in the opposite direction, whereupon the roller flange 21 of the roller 2 located on the other side comes to bear against the clamping device 5 located on the other side of the connecting strut 43. The axial length of the cylindrical running surface 25 is here somewhat greater than the distance of the side wall 21a from the adjacent side edge of the running groove 22.

As soon as the rollers 2 make their way onto one of the oblique surfaces 23, the conveyor is switched off. Despite this, the case can still arise that the strands 11 and 12 of the conveyor belt 1 are further shifted in relation to the clamping devices 5 due to very large lateral wind forces.

Figure 3B:
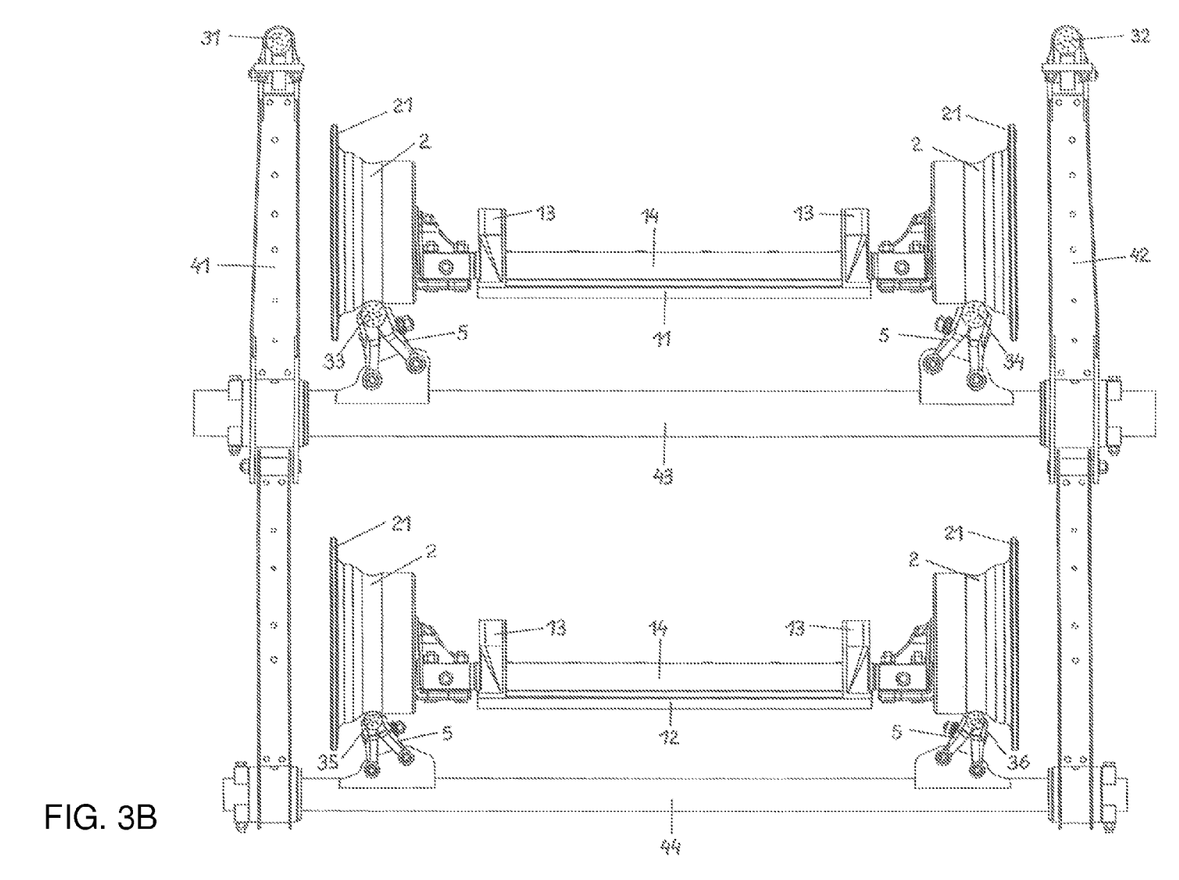
FIG. 3B is a front view of a second embodiment of the conveyor according to the invention, viewed in a direction of movement of the conveyor belt.

In FIG. 3B, which corresponds to FIG. 3, a second embodiment with respect to the tilt of the two clamping devices 5 and to the position of the roller flanges 21 is represented. Here the clamping devices 5 located on the two horizontal connecting struts 43 and 44 are not inclined toward each other but away from each other, and the rollers 2 are configured on their side facing away from the conveyor belt 1 with roller flanges 21. This design is obtained when the clamping devices 5 located on the connecting struts 43 and 44, and the rollers 2 assigned thereto, according to FIG. 3, are mutually exchanged.

The working method and advantages of the two represented embodiments are identical.

Figure 4:
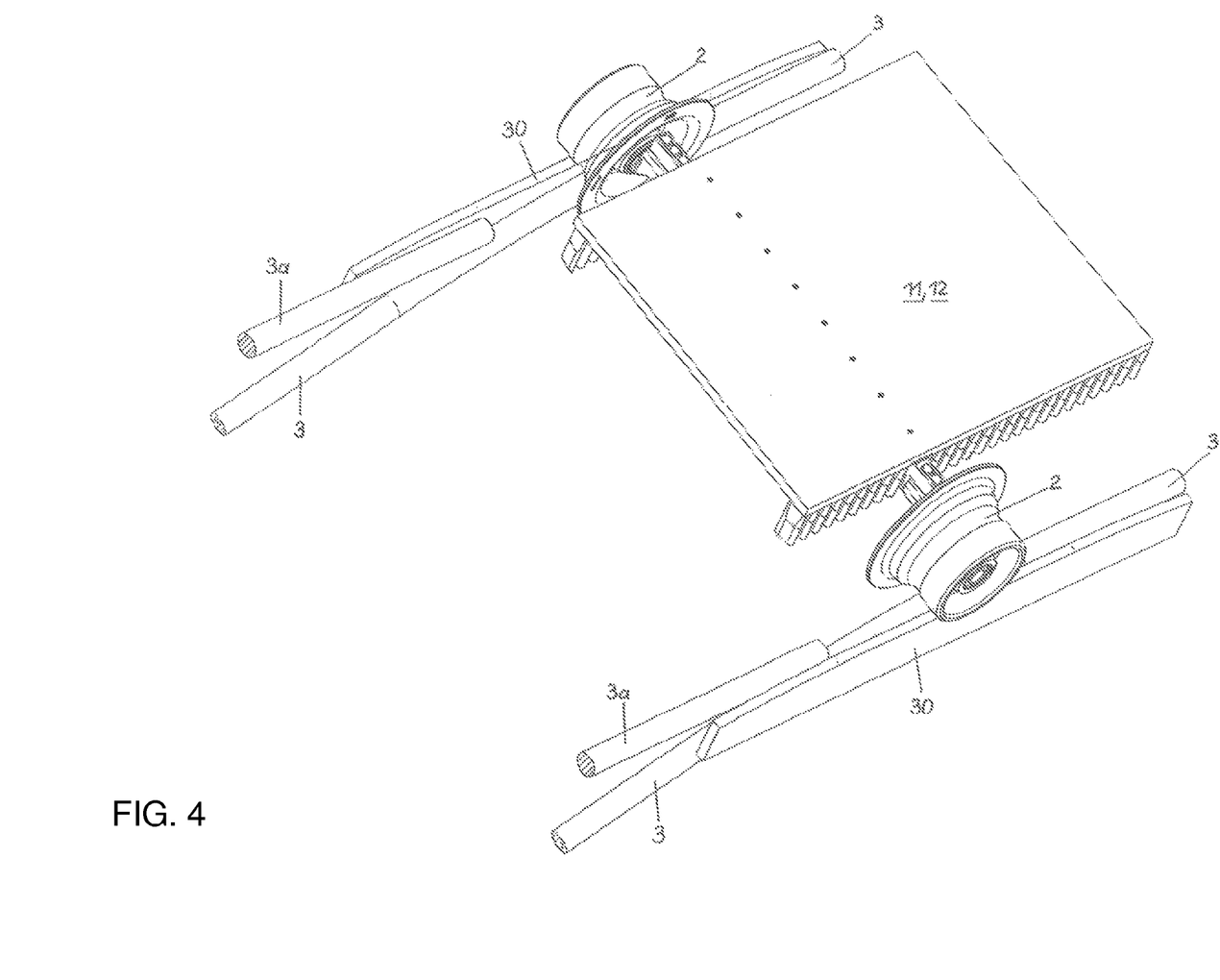
FIG. 4 is a diagrammatic, perspective view of a transition of the conveyor according to the invention between supporting cables and supporting rails.

From FIG. 4, the configuration of the transition from supporting cables 3 to guide rails 3a can also be seen. Two supporting cables 3 are here adjoined by two cable crossings 30, which pass into cylindrical guide rails 3a. The supporting cables 3 are guided away obliquely downward from the cable crossings 30. Since the rollers 2 are configured only with a single roller flange 21 each, they can move without hindrance from the supporting cables 3 to the guide rails 3a.

The invention claimed is:

1. A conveyor for transporting bulk materials, comprising:
three pairs of supporting cables disposed vertically one above another and including lower supporting cables, middle supporting cables and upper supporting cables;
return drums;
a self-contained conveyor belt being movable along said supporting cables and at ends of the conveyor, said conveyor belt being guided over said return drums;
mounted rollers;
supporting beams fastened to said conveyor belt, said supporting beams disposed at a distance apart and aligned transversely to a longitudinal extent of said conveyor belt and at ends of said supporting beams are disposed said mounted rollers, said mounted rollers roll along said middle supporting cables and said lower supporting cables;
clamping devices;
supporting frames disposed at a distance apart from each other in a longitudinal direction of the conveyor and by means of which said supporting cables are mutually connected, each of said supporting frames formed from two at least approximately vertically aligned supporting struts and two at least approximately horizontally aligned connecting struts and, upper ends of said vertically aligned supporting struts are respectively connected to one of said two upper supporting cables, and said horizontally aligned connecting struts are connected by means of said clamping devices disposed thereon to said middle and to said lower supporting cables;

said clamping devices disposed on said connecting struts and respectively assigned to said middle supporting cables;

said lower supporting cables form an acute angle with said connecting struts; and said mounted rollers have a roller flange on one side only.

2. The conveyor according to claim 1, wherein said clamping devices disposed on a respective one of said connecting struts are inclined toward each other, and said mounted rollers are configured with said roller flange on a side facing toward said conveyor belt.

3. The conveyor according to claim 1, wherein said clamping devices disposed on a respective one of said connecting struts are inclined away from each other, and said mounted rollers are configured with said roller flange on a side facing away from said conveyor belt.

4. The conveyor according to claim 1, wherein each of said clamping devices has two clamping jaws, which at their ends facing away from clamping surfaces are pivotable on said respective connecting strut about axes aligned at least approximately in a motional direction of said conveyor belt, a plane defined by said pivot axes of said two clamping jaws forming an acute angle of 5° to 60° with said respective connecting strut.

5. The conveyor according to claim 4, wherein a plane of symmetry between said two clamping jaws forms a further acute angle of 85° to 30° with the connecting strut.

6. The conveyor according to claim 4, further comprising a tension bolt, said two clamping jaws can be tied to an associated one of said supporting cables by means of said tension bolt aligned parallel to a plane defined by their pivot axes.

7. The conveyor according to claim 4, wherein said two clamping jaws form an additional acute angle of 5° to 45° with each other.

8. The conveyor according to claim 4, wherein said clamping jaw facing toward said roller flange of said mounted roller forms a further acute angle of somewhat less than 90° with said respective connecting strut.

9. The conveyor according to claim 1, wherein said mounted rollers have an outer surface configured with a running groove, as well as in a direction of said roller flange at least one oblique surface and, on a side facing away from said roller flange, a cylindrical running surface.

10. The conveyor according to claim 9, wherein said mounted rollers, away from said running groove, are configured with a first oblique surface, which forms an angle of 10° to 60° with a roller axis, and also with a second oblique surface, which forms an angle of 5° to 20° with said roller axis.

11. The conveyor according to claim 8, wherein said clamping jaw facing toward said roller flange is configured, on a side facing toward said roller flange, with a contact surface assigned to said roller flange.

12. The conveyor according to claim 4, wherein said acute angle is about 20°.

13. The conveyor according to claim 5, wherein said further acute angle is about 70°.

14. The conveyor according to claim 7, wherein said additional acute angle is about 40°.

15. The conveyor according to claim 10, wherein said angle of said first oblique surface is about 35° and said angle of said second oblique surface is about 10°.

\* \* \* \* \*